United States Patent [19]

Petke et al.

[11] 4,352,925
[45] Oct. 5, 1982

[54] HEAT RESISTANT COPOLYESTER ADHESIVES

[75] Inventors: Frederick D. Petke; Bobby J. Sublett; Richard L. McConnell, all of Kingsport, Tenn.

[73] Assignee: Eastman Kodak Company, Rochester, N.Y.

[21] Appl. No.: 207,818

[22] Filed: Nov. 17, 1980

[51] Int. Cl.$^3$ .............................................. C08G 63/18
[52] U.S. Cl. .................................... 528/309; 156/332; 428/481; 523/100; 524/601
[58] Field of Search ............... 156/332; 528/272, 309; 428/481; 524/601; 523/100

[56] References Cited

U.S. PATENT DOCUMENTS

| | | | |
|---|---|---|---|
| 2,698,239 | 12/1954 | Alles et al. | 430/533 |
| 2,744,087 | 5/1956 | Snyder | 528/309 |
| 4,048,253 | 9/1977 | Ooba et al. | 260/40 TN |
| 4,062,907 | 12/1977 | Sublett | 156/332 |
| 4,075,180 | 2/1978 | Davis et al. | 156/332 |
| 4,154,918 | 5/1979 | Buxbaum et al. | 528/309 |
| 4,156,774 | 5/1979 | Buxbaum et al. | 528/309 |

FOREIGN PATENT DOCUMENTS

| | | | |
|---|---|---|---|
| 48-32142 | 4/1973 | Japan | 156/332 |
| 48-32143 | 4/1973 | Japan | 156/332 |

*Primary Examiner*—Ronald W. Griffin
*Attorney, Agent, or Firm*—John F. Stevens; Daniel B. Reece, III

[57] ABSTRACT

Disclosed are heat-resistant adhesive compositions comprising a copolyester derived from terephthalic acid, from about 30 to about 50 mol % diethylene glycol, and at least 50 mol % ethylene glycol, the polyester having an inherent viscosity of from about 0.4 to about 1.0. The composition is especially useful in bonding parts of ovenable food containers.

13 Claims, No Drawings

HEAT RESISTANT COPOLYESTER ADHESIVES

TECHNICAL FIELD

This invention relates to copolyesters derived from dimethyl terephthalate, ethylene glycol, and diethylene glycol, useful as hot-melt adhesives.

The hot-melt adhesives according to this invention are especially useful in the bonding of parts of ovenable containers. "Ovenable containers" as used herein is intended to mean containers which will withstand heat of the intensity and for the duration of time normally encountered in ovens, e.g., 400° F. for one hour.

BACKGROUND ART

Ovenable paperboard trays are sometimes used as replacements for aluminum trays for the packaging of frozen foods. The ovenable board is often made by extrusion-coating poly(ethylene terephthalate) onto paperboard, which is formed into trays or is made into folding cartons. The trays are generally covered with lids made of poly(ethylene terephthalate)-coated board or film. Poly(ethylene terephthalate)-coated board is sometimes heat sealed to the ovenable tray, but inadequate seals are frequently obtained on trays in which food has been cooked, probably because of crystallization of the poly(ethylene terephthalate) coating during cooking. Quick-setting latex adhesives are also used, but some of these adhesives provide bonds which fail at low temperatures, and the adhesive applicators must be cleaned too frequently.

Certain four- and five-component, amorphous polyesters can be solution-coated onto poly(ethylene terephthalate) lidding film, and these coated films can be heatsealed to poly(ethylene terephthalate)-coated ovenable board but the lidded packages frequently debond when stored at low temperatures or when heated in an oven at 400° F. There is a need for an improved adhesive which is coatable by extrusion or solution techniques, which will bond to both crystallized and non-crystallized poly(ethylene terephthalate) coatings on paperboard trays and adhere to both poly(ethylene terephthalate) film and poly(ethylene terephthalate)-coated paperboard lids.

Polyesters derived from terephthalic acid, ethylene glycol and diethylene glycol are well known in the art but it is believed that the critical ranges of the monomers used in making the polyester which are required for ovenable containers is novel. For example, German Pat. No. 1,110,412 discloses films of high molecular weight terephthalate polyesters based on at least one glycol of the formula $HO(CH_2)_nOH$ where $n=2-10$ and 2–5% of a polyglycol which may be diethylene glycol. U.S. Pat. No. 2,698,239 discloses photographic film supports based on a hydrophobic film coated on one surface with terephthalate polyesters derived from a polymethylene glycol containing 2 to 10 methylene groups and a compound selected from the group consisting of polyethylene glycols, saturated aliphatic dicarboxylic acids of 4 to 16 carbon atoms, their acid chlorides, or their esters. Copolyesters containing the broad range of 20–100% diethylene glycol are disclosed. This patent does not teach the use of these polyesters as adhesives. U.S. Pat. No. 4,154,918 discloses polyester adhesives based on 70–95 mol % terephthalic acid, 5–30% isophthalic acid, 20 to 60 mol % ethylene glycol, and 40 to 80 mol % diethylene glycol which have relative viscosities of 1.7–4.0 (I.V.=0.5–1.38). Up to 18 mol % of the ethylene glycol content may be replaced by a bisphenol dihydroxyalkyl ether. U.S. Pat. No. 4,156,774 discloses polyester adhesives based on 80–100 mol % terephthalic acid, 0–20 mol % of aliphatic, cycloaliphatic, or other aromatic dicarboxylic acids, 30–60 mol % ethylene glycol, 30–69 mol % diethylene glycol, and 1–10 mol % polybutylene glycol having a minimum relative viscosity of 1.4 (minimum I.V.=0.34). Up to 20 mol % of ethylene glycol or diethylene glycol can be replaced with alkylenediols having 3 to 10 carbon atoms and/or bisphenol dihydroxyalkyl esters. U.S. Pat. No. 4,048,253 discloses adhesives based on ether-type polyesters, polyurethanes, and a polyisocyanate. The ether-type polyesters are prepared by heat-treating poly(ethylene terephthalate) with glycols containing at least three carbon atoms and the ether-type polyester obtained may contain from 30 to 100 mol % diethylene glycol.

DISCLOSURE OF THE INVENTION

According to this invention, there are provided copolyesters especially useful as adhesives for bonding parts of articles which are required to withstand high temperatures. The copolyesters are derived from a dicarboxylic acid component and a glycol component. The dicarboxylic acid component comprises at least 99 mol % terephthalic acid. The glycol component comprises about 30 to about 50 mol % diethylene glycol and at least 50 mol % ethylene glycol.

Especially preferred for use in accordance with this invention is for the dicarboxylic acid component to consist essentially of terephthalic acid. Also especially preferred is for the glycol component to consist essentially of about 30 to about 50 mol % diethylene glycol and about 70 to about 50 mol percent ethylene glycol. Most preferred is for the glycol component to consist essentially of about 32 to about 40 mol % diethylene glycol and about 68 to about 60 mol % ethylene glycol.

If the diethylene glycol content is less than about 30 mol %, the polyesters are not readily soluble in suitable solvents and their melting points are too high to be reactivated by heatsealing at 400° F. If the diethylene glycol content is greater than about 50 mol %, the glass transition temperature is low, making the polyesters difficult to handle in bulk and coated form. Also, bonds made with such materials frequently fail when heated at 400° F. to simulate cooking conditions.

The inherent viscosity (I.V.) of these adhesives is such that satisfactory cohesive strength is obtained to enable bonding under minimum heat sealing conditions yet allow the polymers to dissolve readily in solvent for solution coating and to maintain bond integrity during baking up to one hour at 400° F. The I.V. of the polyesters is from about 0.4 to about 1.0 dL/g, preferably from about 0.5 to about 0.9 dL/g.

Compositions useful in this invention are readily soluble in certain chlorinated solvents. Layers of adhesive can be coated from solution as thin as 0.1 mil. Adhesive layers may also be extruded onto film, paper, or paperboard lids at thicknesses of about 1 to 2 mils. Lids adhered with these adhesives are resistant to delamination when lidded trays are blast frozen at −40° F., are stored at −10° to −15° C., or are baked at up to 400° F. for one hour.

The copolyesters of this invention are readily prepared using typical polycondensation reaction conditions well known in the art. See, for example, British Pat. No. 1,047,072. They may be prepared by either batch or continuous processes.

Typical polyesterification catalysts which may be used include titanium alkoxides, dibutyl tin dilaurate, and combinations of zinc, manganese or magnesium acetates or benzoates with antimony oxide or antimony triacetate.

The coating is especially adapted for application to a substrate from a solution. Suitable solvents include chlorinated solvents such as methylene chloride, chloroform, 1,1,2-trichloroethane, and 1,1,2,2-tetrachloroethane. Such solutions may be made using about 5 to about 15 parts by weight of the copolyester. Upon evaporation of the solvent, a solid adhesive layer remains on the substrate which may be adhered to another surface by melting the adhesive.

The copolyesters may be put into suitable form such as pellets, granules, chips, etc., for subsequent application to a substrate as a coating.

Although the adhesive according to this invention is primarily adapted for use on articles such as food containers which are to be subjected to high temperatures encountered in ovens, it also has different uses. For example, it may be used on various types of paper, paperboard, plastic, leather, metal, wood, ceramics, etc. It is especially suitable for use on poly(ethylene terephthalate) or substrates coated with poly(ethylene terephthalate).

Conventional additives may be used in the copolyester. These include colorants, plasticizers, and antioxidants.

Whenever the term "inherent viscosity" (I.V.) is used in this application, it will be understood to refer to viscosity determinations made at 25° C. using 0.25 gram of polymer per 100 ml. of a solvent composed of 60 wt. % phenol and 40 wt. % tetrachloroethane.

The "melting point" ($T_m$) of the polymers described in this application are readily obtained with a Differential Scanning Calorimeter.

The "heat of fusion" $\Delta H_f$ of polymers is the amount of heat absorbed when crystallizable polymers are melted. $\Delta H_f$ values are readily obtained using Differential Scanning Calorimeters (Perkin-Elmer). For example, one method for determining $\Delta H_f$ is described in Journal of Applied Polymer Science, 20, 1209 (1976). Measurement of $\Delta H_f$ is also described in duPont Thermal Analysis Bulletin No. 900-8 (1965). Qualitatively, it is possible to compare the degree of crystallinity of polymers by comparing their $\Delta H_f$ values.

The strength of the bonds is determined by the so-called "Peel Test" based on a modification of the ASTM "T-Peel Test" set forth on pages 63 and 64 of the 1964 edition of the BOOK OF ASTM STANDARDS, published by the American Society for Testing Materials, and more specifically identified as Test Number D-1876-61-T.

The following examples are submitted for a better understanding of the invention.

EXAMPLE 1

A 500-mL round-bottom flask is charged with 135.8 g (0.70 mol) of dimethyl terephthalate, 68.0 g (1.1 mol) of ethylene glycol, 40.0 g (0.38 mol) of diethylene glycol, and 4.7 mL of acetyl titanium isopropoxide catalyst solution, (163 g of ethylene glycol, 0.43 g acetic acid, and 2.0 g titanium tetraisopropoxide) to give a concentration of 67 ppm of Ti based on the expected polymer weight. The flask is flushed with nitrogen, fitted with a motorized stirrer, and is connected to a vacuum pump. A metal bath is used to heat the flask. The flask is heated to 200° C. for one hour, while the reactants are stirred, under a nitrogen atmosphere. Methanol is evolved and is collected in a trap as transesterification proceeds. Next, the temperature is raised to 215° C. for one hour while transesterification continues. Finally, the temperature of the bath is raised to 277° C. When this temperature has been reached, the flask is evacuated to less than 0.5 torr with the vacuum pump to remove excess glycol components. The reaction is run under these conditions for 75 minutes, with constant stirring. As the polymer molecular weight increases, the stirring speed is reduced to maintain contact of the polymer with the flask walls. After the 75-minute polyesterification period, the flask is removed from the heating bath and the flask is repressurized with $N_2$. The polyester is allowed to cool and is removed from the flask by breaking away the flask. The resulting polyester has an I.V. of 0.66 dL/g and a diethylene glycol content of 37 mol % (analyzed by hydrolysis/gas chromatography technique). The copolyester is tough, slightly yellowish, and clear and it has a DSC melting point of 183° C. and a glass transition temperature of 57° C. when measured on a Differential Scanning Calorimeter (DSC) IIb instrument at a heating rate of 20° C./minute.

Five grams of the polyester prepared above are dissolved in 95 g of chloroform at 50° C., with stirring. The polymer remains in solution as the mixture cools to room temperature. The polymer solution is coated onto 2.0-mil-thick poly(ethylene terephthalate) film with a No. 60 wire-wound coating rod. The coating, when dried for two hours at room temperature and two days at 50° C., measures 0.2 mil thick. The coated poly(ethylene terephthalate) films are heatsealed at 400° F. for 0.5 seconds to pieces of paperboard previously coated with 1¼ mils of poly(ethylene terephthalate); the poly(ethylene terephthalate)-coated board samples are either amorphous (as-prepared) or crystallized (15 minutes at 150° C. to simulate cooking prior to lidding). The bonds are set aside to cool and are aged two days at 50° C. The bonds are tested by peeling the film from the poly(ethylene terephthalate) coated board at a 90° peel angle, measuring the maximum peel force with a spring-loaded force gauge. Bonds of the film to the crystallized poly(ethylene terephthalate) have a strength of 0.8 pounds/inch with failure at the interface. Similar bonds made to noncrystallized polyethylene terephthalate coating have a strength of 3.5 pounds/inch with failure being cohesive in the poly(ethylene terephthalate) film.

EXAMPLE 2

A polyester is prepared by the method of Example 1 using 135.8 g (0.7 mol) of dimethyl terephthalate, 65.8 g (1.05 mol) of ethylene glycol, 38.9 g (0.37 mol) of diethylene glycol, and 4.7 mL of the catalyst solution of Example 1. The polymer which results has an I.V. of 0.42 dL/g and a diethylene glycol content of 34 mol % (by hydrolysis/gas chromatography analysis). The polyester is tough, has a melting point of 193° C. (3.9 cal/g heat of fusion) and a glass transition temperature of 60° C. The polymer is pale yellow and opaque. A solution of 5 wt. % of this polyester in methylene chloride is prepared and is coated onto 0.5 mil polyethylene terephthalate film with a coating rod. The coated film is bonded at 400° F. for 0.5 seconds to poly(ethylene terephthalate)-coated board, both crystallized and noncrystallized. Bonds to the noncrystallized poly(ethylene terephthalate) coating failed cohesively by breaking the film at 2.9 pounds/inch; bonds to the crystallized poly(ethylene terephthalate) coating failed by peeling with a peel strength of 1.1 pounds/inch.

EXAMPLE 3

An adhesive containing terephthalic acid, ethylene glycol, and diethylene glycol, made by the process of Example 1, is analyzed to contain 33 mol % diethylene glycol and it has an I.V. of 0.5 dL/g. The adhesive is coated onto 2-mil polyester film approximately 0.5 mils thick. The adhesive is heatsealed to crystallized and noncrystallized poly(ethylene terephthalate)-coated paperboard at several temperature/time conditions. When the bonds are tested as described in Example 1, the following results are obtained:

| Temperature (°F.)/ | T-Peel Strength, Pounds/Inch | |
| Time (Second) | Crystallized | Noncrystallized |
| --- | --- | --- |
| 375/0.5 | 1.0 | 2.9 |
| 400/0.5 | 1.6 | 3.0 |
| 400/0.2 | 1.2 | 2.6* |
| 400/0.1 | 1.9 | 2.3 |
| 425/0.5 | 1.7 | 2.9 |
| 425/0.2 | 2.3 | 1.9* |
| 425/0.1 | 2.0 | 3.6* |

*Denotes substrate failure.

EXAMPLE 4 (Control)

A polyester is prepared by the method of Example 1 from dimethyl terephthalate (135.8 g=0.7 mol), ethylene glycol (76.0 g=1.24 mol), diethylene glycol (29.0 g=0.27 mol), and 4.7 mL of acetyl titanium isopropoxide solution (Example 1). The polyester contains 28 mol % of diethylene glycol and it has an I.V. of 0.57 dL/g. The polymer does not dissolve in either methylene chloride or chloroform, so no solution coatings are possible. The polymer melts too high to bond at 400° F.

Poly(ethylene terephthalate) modified with 28 mol % diethylene glycol is extrusion coated onto 24 point paperboard at 234° C. This coated board does not heat seal to polyethylene terephthalate coated paperboard at 400° F./0.5 second.

EXAMPLE 5

A polyester is prepared by the method of Example 1 from a mixture of 135.8 g of dimethyl terephthalate, 66.3 g of ethylene glycol, 39.8 g of diethylene glycol, and 100 ppm of Ti catalyst (7.6 g of the catalyst solution of Example 1). The resulting polyester contains 38 mol % diethylene glycol and it has an I.V. of 0.96 dL/g. This polyester is extruded onto kraft paper in a Brabender extruder at 225° C. The adhesive layer is 1½ mils thick. The coated paper is heatsealed to crystallized and noncrystallized polyethylene terephthalate-coated paperboard at 425° F. for 0.2 seconds. Bonds are tested in a 90° peel angle configuration and are found to have a peel strength of 1.3 pounds/inch on crystallized substrate and 2.8 pounds/inch (with delamination of the coated paperboard) on the noncrystallized substrate.

EXAMPLE 6 (Control)

A copolyester is prepared as described in Example 1 from a mixture containing 135.7 g (0.70 mol) of dimethyl terephthalate, 21.7 g (0.35 mol) of ethylene glycol, 111.3 g (1.05 mol) of diethylene glycol, and enough n-butanol solution of titanium tetraisopropoxide (2.4 wt. % Ti) to give 100 ppm Ti based on the weight of polymer to be prepared. The copolymer contains 75 mol % of diethylene glycol (by hydrolysis/gas chromatography analysis) and it has an I.V. of 0.62 dL/g. The copolymer has a glass transition temperature of 30° C. This copolymer is not suitable for use as a hot-melt adhesive for this application because its glass transition temperature is so low that it is difficult to process into pellet form. Also, the pellets become tacky and cold flow when slightly warmed. Paperboard coated with this adhesive is tacky and coated sheets block severely when stacked. Bonds made to poly(ethylene terephthalate)-coated paperboard at 400° F. do not withstand cooking tests at 400° F.

EXAMPLE 7 (Control)

A copolyester prepared by the method of Example 1 is analyzed to contain 52 mol % of diethylene glycol, 48 mol % of ethylene glycol, and 100 mol % of terephthalic acid. This copolyester has an I.V. of 0.77 dl/g. The copolymer is amorphous, has no melting point, and has a glass transition temperature of 48° C. The copolyester is readily soluble in methylene chloride at 10% solids at 60° C. The adhesive is coated from this methylene chloride solution onto 0.5 mil poly(ethylene terephthalate) and the coated film is heatsealed to poly(ethylene terephthalate)-coated paperboard at 400° F. for 0.5 sec. The samples are suspended in a circulating air oven at room temperature with a 100 g. mass attached to the film in a peel configuration. The temperature of the oven is increased in 10° C. increments each ten minutes until the bonds fail by peeling (peel failure temperature test). Duplicate samples fail at 100° C. Duplicate samples of other adhesives fail at much higher temperatures.

| % Diethylene Glycol in Copolyester | Peel Failure Temperature, °C. |
| --- | --- |
| 52 | 100 |
| 44 | 150 |
| 37 | 150 |

This example illustrates that polyester adhesive having more than 50 mol % of diethylene glycol have sharply reduced peel failure temperatures than do those in the desired range having 30–50 mol % diethylene glycol.

Where the term terephthalic acid is used herein, it is intended that polyester-forming derivatives thereof be included. For example, it is well known in the art that dimethyl terephthalate is useful in forming terephthalate esters.

All parts, percentages, ratios, etc., are on a weight basis unless otherwise indicated.

The invention has been described in detail with particular reference to preferred embodiments thereof, but it will be understood that variations and modifications can be effected within the spirit and scope of the invention.

We claim:

1. A heat-resistant adhesive composition comprising a copolyester derived from a dicarboxylic acid component and a glycol component, said dicarboxylic acid component comprising at least 99 mol % terephthalic acid, and said glycol component consisting essentially of from about 30 to about 50 mol % diethylene glycol and from about 70 to about 50 mol % ethylene glycol, said polyester having an inherent viscosity of from about 0.4 to about 1.0 when measured at 25° C. using 0.25 gram of polymer per 100 ml of a solvent composed of 60 wt. % phenol and 40 wt. % tetrachloroethane.

2. Composition according to claim 1 wherein essentially all of the dicarboxylic acid component is terephthalic acid.

3. Composition according to claim 1 wherein said glycol component comprises from about 32 to about 40 mol % diethylene glycol.

4. Composition according to claim 1 wherein the inherent viscosity of said polyester is between about 0.5 and about 0.9.

5. A heat-resistant adhesive composition comprising a copolyester having a dicarboxylic acid component and a glycol component, said dicarboxylic acid component consisting essentially of terephthalic acid, and said glycol component consisting essentially of about 32 to about 40 mol % diethylene glycol, and from about 68 to about 60 mol % ethylene glycol, said polyester having an inherent viscosity of from about 0.5 to about 0.9 when measured at 25° C. using 0.25 gram of polymer per 100 ml of a solvent composed of 60 wt. % phenol and 40 wt. % tetrachloroethane.

6. A solution comprising the copolyester of claim 1 and an organic solvent.

7. A solution comprising the copolyester of claim 5 and an organic solvent.

8. A substrate having a coating comprising the composition of claim 1.

9. A substrate having a coating comprising the composition of claim 5.

10. A paper or polyester substrate having a coating comprising the composition of claim 1.

11. A paper or polyester substrate having a coating comprising the composition of claim 5.

12. An ovenable food container having parts thereof bonded with the composition of claim 1.

13. An ovenable food container having parts thereof bonded with the composition of claim 5.

* * * * *